(12) United States Patent
Nair et al.

(10) Patent No.: US 11,308,498 B2
(45) Date of Patent: Apr. 19, 2022

(54) REAL-TIME RISK BASED PAYMENT DECISION SERVICE FOR TRANSIT SYSTEM

(71) Applicant: VISA INTERNATIONAL SERVICE ASSOCIATION, San Francisco, CA (US)

(72) Inventors: Syam Sasidharan Nair, Singapore (SG); Francois Hribovsek, Singapore (SG)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 6 days.

(21) Appl. No.: 16/511,954

(22) Filed: Jul. 15, 2019

(65) Prior Publication Data

US 2021/0019752 A1 Jan. 21, 2021

(51) Int. Cl.
*G06Q 20/40* (2012.01)
*G06Q 30/02* (2012.01)
*G06Q 20/32* (2012.01)
*G06Q 50/30* (2012.01)

(52) U.S. Cl.
CPC ..... *G06Q 20/4016* (2013.01); *G06Q 20/3278* (2013.01); *G06Q 30/0284* (2013.01); *G06Q 50/30* (2013.01)

(58) Field of Classification Search
CPC ........ G06Q 20/40; G06Q 50/30; G06Q 20/32; G06Q 30/02; G06Q 20/4016; G06Q 20/3278; G06Q 30/0284
USPC .......................................................... 705/44
See application file for complete search history.

(56) References Cited

U.S. PATENT DOCUMENTS

| | | | |
|---|---|---|---|
| 6,516,056 B1* | 2/2003 | Justice | G06Q 20/4016 379/114.01 |
| 9,741,178 B1* | 8/2017 | Handley | G06Q 20/127 |
| 10,049,349 B1* | 8/2018 | Grassadonia | G06Q 20/40 |
| 10,049,363 B2* | 8/2018 | Monk | G07C 9/00 |
| 10,055,735 B2* | 8/2018 | Dixon | G06Q 20/3821 |
| 10,354,251 B1* | 7/2019 | Gailloux | G06Q 20/405 |
| 10,366,378 B1* | 7/2019 | Han | G06Q 20/202 |
| 10,755,281 B1* | 8/2020 | Yip | G06Q 20/4016 |
| 2007/0012763 A1* | 1/2007 | Van de Velde | G06Q 20/045 235/380 |

(Continued)

OTHER PUBLICATIONS

"The Free Dictionary" Definitions of "Public Transport". (Redirected from Transit system). Citing: Collins English Dictionary—Complete and Unabridged, 12th Edition 2014 © HarperCollins Publishers. (Year: 2014).*

(Continued)

*Primary Examiner* — Narayanswamy Subramanian
*Assistant Examiner* — Ayal I. Sharon
(74) *Attorney, Agent, or Firm* — Loeb & Loeb LLP

(57) ABSTRACT

Information for a payment account of a user of a transit system may be received. A risk analysis may be performed using the information for the payment account based on one or more parameters to determine a risk score for the user. The risk score for the user may be provided to a transit payment system. Whether the user is a high risk based on the risk score may be determined. If the user is a high risk, payment or payment authorization from the user via the transit payment system may be required before the user exits the transit system.

20 Claims, 5 Drawing Sheets

(56) References Cited

U.S. PATENT DOCUMENTS

| | | | |
|---|---|---|---|
| 2008/0033880 A1* | 2/2008 | Fiebiger | G06Q 20/40 705/44 |
| 2008/0179394 A1* | 7/2008 | Dixon | G06Q 20/382 235/380 |
| 2009/0157518 A1* | 6/2009 | Bishop | G06Q 20/40 705/19 |
| 2009/0157519 A1* | 6/2009 | Bishop | G06Q 20/02 705/19 |
| 2009/0164324 A1* | 6/2009 | Bishop | G06Q 20/204 705/17 |
| 2009/0164325 A1* | 6/2009 | Bishop | G06Q 20/204 705/17 |
| 2009/0164326 A1* | 6/2009 | Bishop | G06Q 20/20 705/19 |
| 2009/0164327 A1* | 6/2009 | Bishop | G06Q 20/12 705/19 |
| 2009/0164328 A1* | 6/2009 | Bishop | G06Q 20/20 705/19 |
| 2009/0164329 A1* | 6/2009 | Bishop | G06Q 20/202 705/19 |
| 2009/0164330 A1* | 6/2009 | Bishop | G06Q 20/202 705/19 |
| 2009/0164331 A1* | 6/2009 | Bishop | G06Q 20/20 705/19 |
| 2009/0307028 A1* | 12/2009 | Eldon | G06Q 30/06 705/37 |
| 2009/0307778 A1* | 12/2009 | Mardikar | G06Q 20/3829 726/26 |
| 2010/0252624 A1* | 10/2010 | Van de Velde | G06Q 20/3827 235/382 |
| 2010/0312617 A1* | 12/2010 | Cowen | G06Q 20/24 705/13 |
| 2012/0221381 A1* | 8/2012 | Dixon | G06Q 20/32 705/13 |
| 2015/0058191 A1* | 2/2015 | Khan | G06Q 20/40 705/35 |
| 2015/0058931 A1* | 2/2015 | Miu | G06Q 20/4016 726/3 |
| 2015/0058950 A1* | 2/2015 | Miu | H04L 63/08 726/7 |
| 2015/0059003 A1* | 2/2015 | Bouse | H04L 63/102 726/28 |
| 2015/0149336 A1* | 5/2015 | Haggerty | G06Q 20/354 705/35 |
| 2015/0161587 A1* | 6/2015 | Khan | G06Q 20/3226 705/44 |
| 2015/0220911 A1* | 8/2015 | Cowen | G06Q 20/105 705/41 |
| 2015/0220929 A1* | 8/2015 | Monk | G07C 9/00 705/13 |
| 2015/0339664 A1* | 11/2015 | Wong | H04L 63/0823 705/71 |
| 2016/0210619 A1* | 7/2016 | Shiota | G06Q 20/4016 |
| 2017/0223017 A1* | 8/2017 | Kohli | H04L 63/18 |
| 2018/0053157 A1* | 2/2018 | Roffey | G06Q 20/206 |
| 2019/0172043 A1* | 6/2019 | Nair | G06Q 20/3224 |
| 2019/0197616 A1* | 6/2019 | Dogin | G06Q 20/4016 |

OTHER PUBLICATIONS

Umar et al. "Tokenisation Blacklisting Using Linkable Group Signatures." In: Deng et al. (eds) Sec. and Privacy in Comm. Networks. SecureComm 2016. Lect. Notes of the Inst. for Comp. Sci., Soc. Informatics and Telecomm. Eng'g, vol. 198. (Online Jun. 14, 2017) https://doi.org/10.1007/978-3-319-59608-2_10 (Year: 2017).*

Pelletier et al. "Smart card data use in public transit: A literature review". Transportation Research Part C: Emerging Technologies vol. 19, Issue 4, Aug. 2011, pp. 557-568. https://doi.org/10.1016/j.trc.2010.12.003 (Year: 2011).*

* cited by examiner

REAL-TIME RISK BASED PAYMENT DECISION SERVICE FOR TRANSIT SYSTEM

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, most transit systems operate on a deferred payment or authorization model as the service is delivered first and then payment is received later. Transit systems that operate on a deferred payment or authorization model are known as open loop systems.

Because of the deferred payment or authorization, transit operators who accept real-time electronic payment take on added risk. To manage risk, transit operators often use a mechanism called deny lists. Deny lists are lists of accounts that are associated with one or more non-paying transit users. The list is generated based on the status of the last payment authorization at the transit operator. The transit operator will add an account onto the deny list when the last transaction with the transit operator's payment system is declined. The transit operator will remove the account from the deny list if and when they receive payment.

Deny lists are generally maintained separately by each transit operator or are only visible to a particular transit operator. In this way, a high-risk or non-paying transit user who is on a deny list for one transit operator (e.g., Operator A) can still use his or her defaulting card or account at a different transit operator (e.g., Operator B), unless and until that operator (e.g., Operator B) adds the defaulting account onto its deny list.

In addition, some transit operators aggregate transit fares for a certain amount or over a certain period of time and then send for authorization. In these systems, there is an even higher risk of transactions being declined resulting in loss of fares due to the additional time delay between the time of service and payment or payment authorization.

The risks associated with real-time electronic payment is a major reason why most tollway transit systems operate in a closed loop system. In a closed loop system, prepaid devices or pre-authorized amounts from a registered payment account are utilized. While closed loop systems are less risky than open loop systems, they are not as user friendly since transit users have to prepay or block some prepaid amount for tolls. Otherwise, the transit users have to pay in cash, which slows the user down as he will have to make various stops along the tollway to pay for various tolls.

Thus, there exists a need for a real-time risk based payment decision service for a transit system to provide the ease of an electronic payment system but reduces the risk of lost fares associated with a traditional deferred payment system. There also exists a need to provide an indication of a high-risk transit user to a transit operator prior to the transit user using the transit system so that the transit operator can proactively deny or require real-time payment of fares, rather than, for example, waiting for the transit user to be added to a deny list.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, information for a payment account of a user of a transit system may be received. A risk analysis may be performed using the information for the payment account based on one or more parameters to determine a risk score for the user. The risk score for the user may be provided to a transit payment system. Whether the user is a high risk based on the risk score may be determined. If the user is a high risk, payment or payment authorization from the user via the transit payment system may be required before the user exits the transit system.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION

At a high level, the systems, methods, and apparatuses described herein attempt to identify users of a transit system that are at a high risk for not paying for their fare amounts. Current systems include both open and closed payment loops. Open loop payment transit systems tend to be more user friendly but are at a higher risk of losing money due to delinquent payments. Closed loop payment transit systems are less user friendly but have a lower risk of losing money as a result of delinquent payments. Thus, there exists a need for a risk analysis decision tool that enables transit operators to identify high risk users so that the transit operator can provide a user friendly transit payment system but at a lower risk than current open loop systems.

Figure 1:
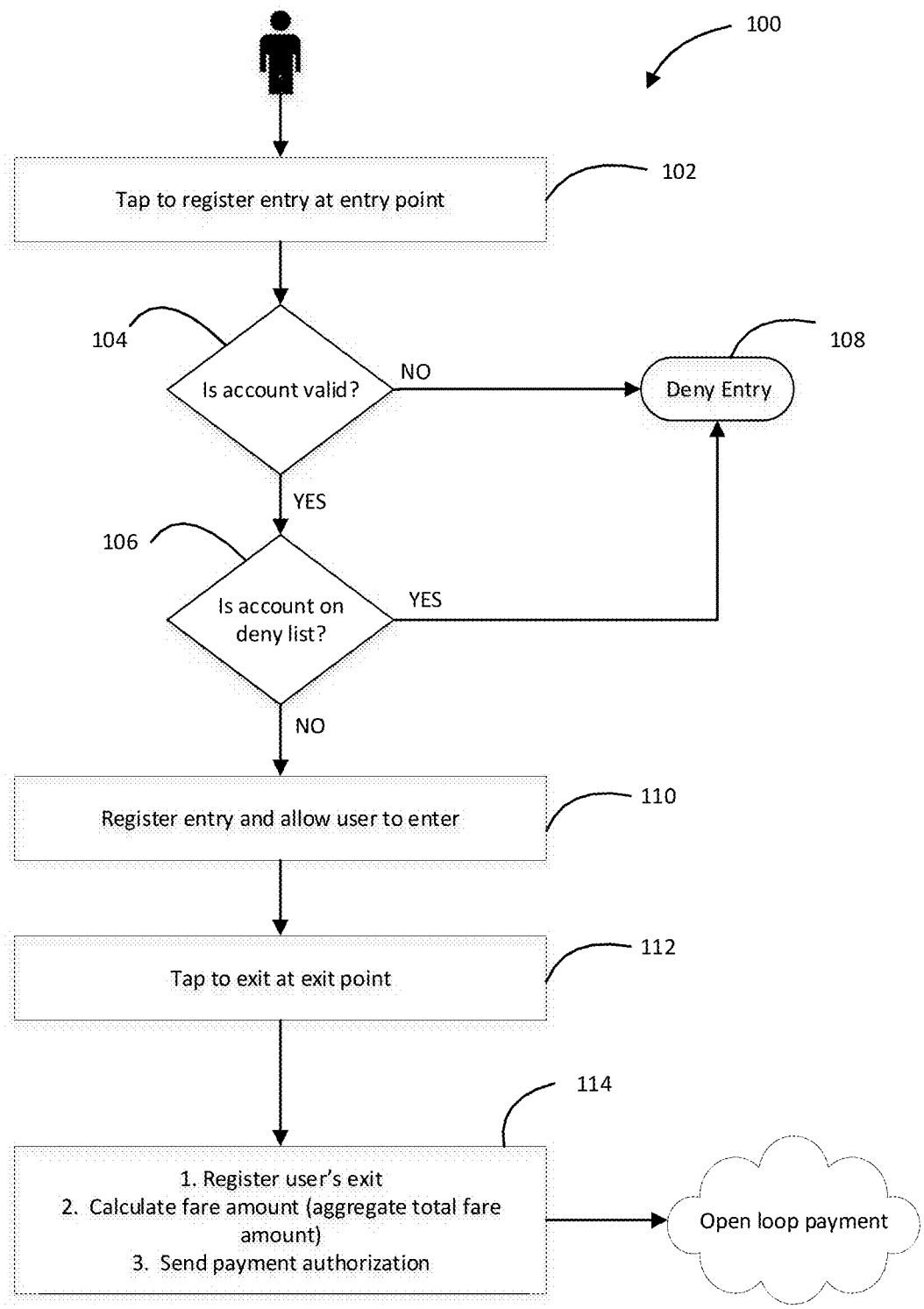
FIG. 1 illustrates a diagram of an open loop payment transit system.

FIG. 1 generally illustrates an exemplary open loop payment transit system 100. At a block 102, a user taps a device which transmits a signal to a receiver that may be part of and/or in communication with a transit payment system for a transit operator. The signal may notify the transit payment system that the user is at an entry point of the transit system so that the process of account validation and registration of the user's entry may begin. The device may also automatically transmit a signal to the receiver at the entry point without the need for a tap.

The device may be a card that is EMV enabled. EMV stands for Europay, MasterCard, and VISA and is a global standard for transaction cards equipped with computer chips and the technology used to authenticate chip-card transactions. The device may also be a portable device such as a mobile phone, laptop, tablet, and the like, or it may be a transponder or other transmitter that may be issued, authorized, or otherwise provided by the transit operator. The device may be a radio frequency identification (RFID) unit that transmits signals to a receiver in communication with the transit payment system.

The signal transmitted to the transit payment system may include payment account information for the user including an account number. At a block 104, the transit payment system may check that the account number for the user is for a valid payment account. If the account is valid, the system may then check whether the payment account is included in a deny list at a block 106.

A deny list is a list that is kept by the transit operator or a third party. The transit operator or third party will add a user's account number to the deny list when the last transaction with the transit operator's payment system is declined. The transit operator will remove the account number from the deny list when the transit operator receives payment. Payment may come from the user and/or through a variety of mechanisms including through a mobile application or website provided by the transit operator where delinquent transit users can go to see their failed transactions and pay using another payment instrument or card. via kiosks provided by the transit operators, the transit operator or a third party can use its backend to retry obtaining payment for a failed transactions, or debt collectors may be utilized.

If the account number is not valid or the account number is on the deny list, the user will be denied entry into the transit system at a block 108. The user can remove his account from the deny list by making a payment for the amount owed to the transit operator. If the account is valid and not on the deny list, at block 110, the user will be granted access to the transit system and entry of the user will be registered with the transit payment system. The user will then proceed to use the transit system.

When the user has reached his desired stop or exit point, the user may tap his device at an exit gate or exit point to notify the transit payment system that the user is exiting the transit system at a block 112. The signal may be sent automatically without the need for a tap.

At a block 114, the transit payment system registers the tap-out or exit and calculates the fare amount. The fare amount may be a flat fee or it may be based on the distance traveled from the entry point to the exit point. The transit payment system then either sends the fare amount to a payment processor for payment processing or the transit payment system will add the fare amount to a running total amount that is aggregated over a period of time (e.g., 24 hours, a week, month, etc.) before sending the total amount for payment processing.

Because there is a delay between the time the user uses the transit service and when payment is sent for processing, loss of fare payment is often a problem as the user may in the interim use up all the funds in his account or max out his account so no further transactions can take place. This problem is exaggerated if the transit operator aggregates a total amount before sending a request for payment or payment authorization as the time delay between the user's travel and payment is even greater.

Figure 2:
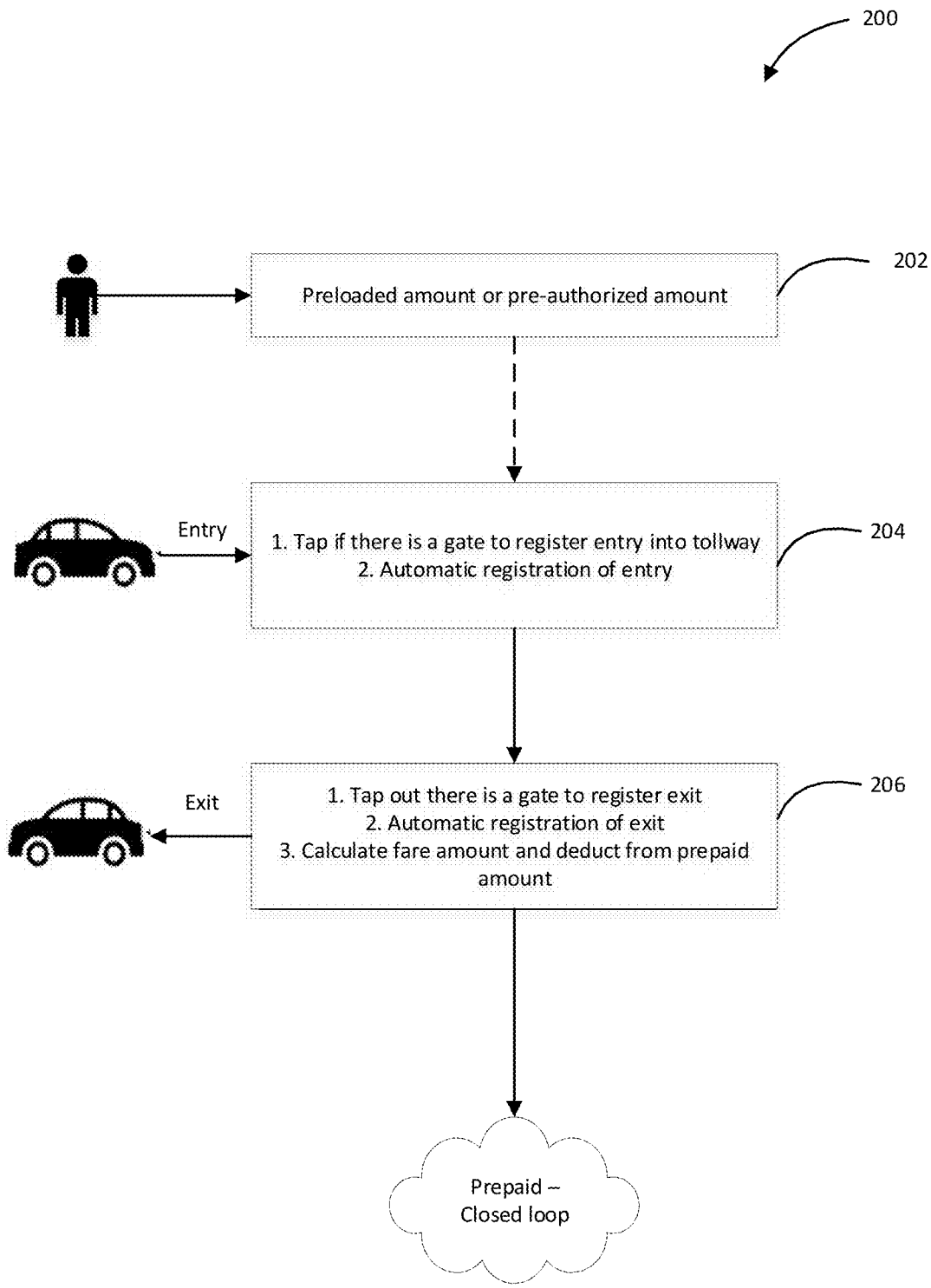
FIG. 2 illustrates a diagram of a closed loop payment transit system.

FIG. 2 generally illustrates an exemplary closed loop payment transit system 200. In a closed loop payment transit system, such as a tollway, a user, at a block 204, may tap a device on a receiver or reader at an entry point, tollbooth, or entry gate of the tollway. The receiver may be part of and/or in communication with a transit payment system. The device may also automatically send a signal to the receiver without the need for a tap.

The device used by the user in the closed loop system may be the same as those used in the open loop system described above. However, in a closed loop system, at a block 202, a prepaid amount may be loaded into the payment account and the prepaid amount may automatically replenish once the amount drops below a set amount. Alternatively, the device may be associated with a payment account that may have a pre-authorized amount so that a payment transaction goes through without any issue. That way payment may be guaranteed when the user exits the closed loop system.

At a block 204, receipt of the signal may register the entry of the user with the transit payment system. However, before the user is allowed to enter, the closed loop system first determines whether the total amount available in the user's account is sufficient to pay for the entire toll road or some portion thereof. If the amount available is not sufficient, then the user may be denied entry, prompted to add additional value to the car (this may also be done automatically by the system), and/or directed to a different tollbooth, for example.

Once registered, the user may be allowed entry onto the tollway. Alternatively, if there is no entry gate, the user simply starts his travels along the tollway until he reaches his exit point or the end of the tollway. At a block 206, the user taps his device at the exit point or gate or the device automatically sends a signal to the payment system via another receiver as the user passes the exit point of the tollway. At a block 208, the user's exit is registered by the transit payment system and the fare amount may be automatically deducted from the prepaid amount or the payment is processed using the pre-authorized amount.

In one embodiment, a tollway may only allow automatic electronic payments via a transponder or other transmitter device issued, authorized, or otherwise associated with the transit operator. However, some users may not have the transit operator's transponder, but may want to use the tollway without having to stop at various checkpoints to pay in cash or by other means. In another embodiment, a tollway system may have express lanes that do now have entry gates or toll booths, but rather only have an overhead gantry that picks up a signal. Some users, may, therefore, either by accident or on purpose, travel on the express lanes without paying. While the license plate of the user's vehicle or other identifying information, such as a picture of the vehicle, may be recorded by the transit operator via a camera or other recording device, and a fare amount assessed and sent to the user via mail or other means or posted online, the user may still refuse to pay the fare. The user may have little or no incentive to pay the outstanding fare particularly if he is just passing by and doesn't plan to return to the city, state, or country where the tollway is. Thus, there exists a need for a system that allows pay-as-you-go electronic payment, but at a lower risk than current open loop systems.

Figure 3:
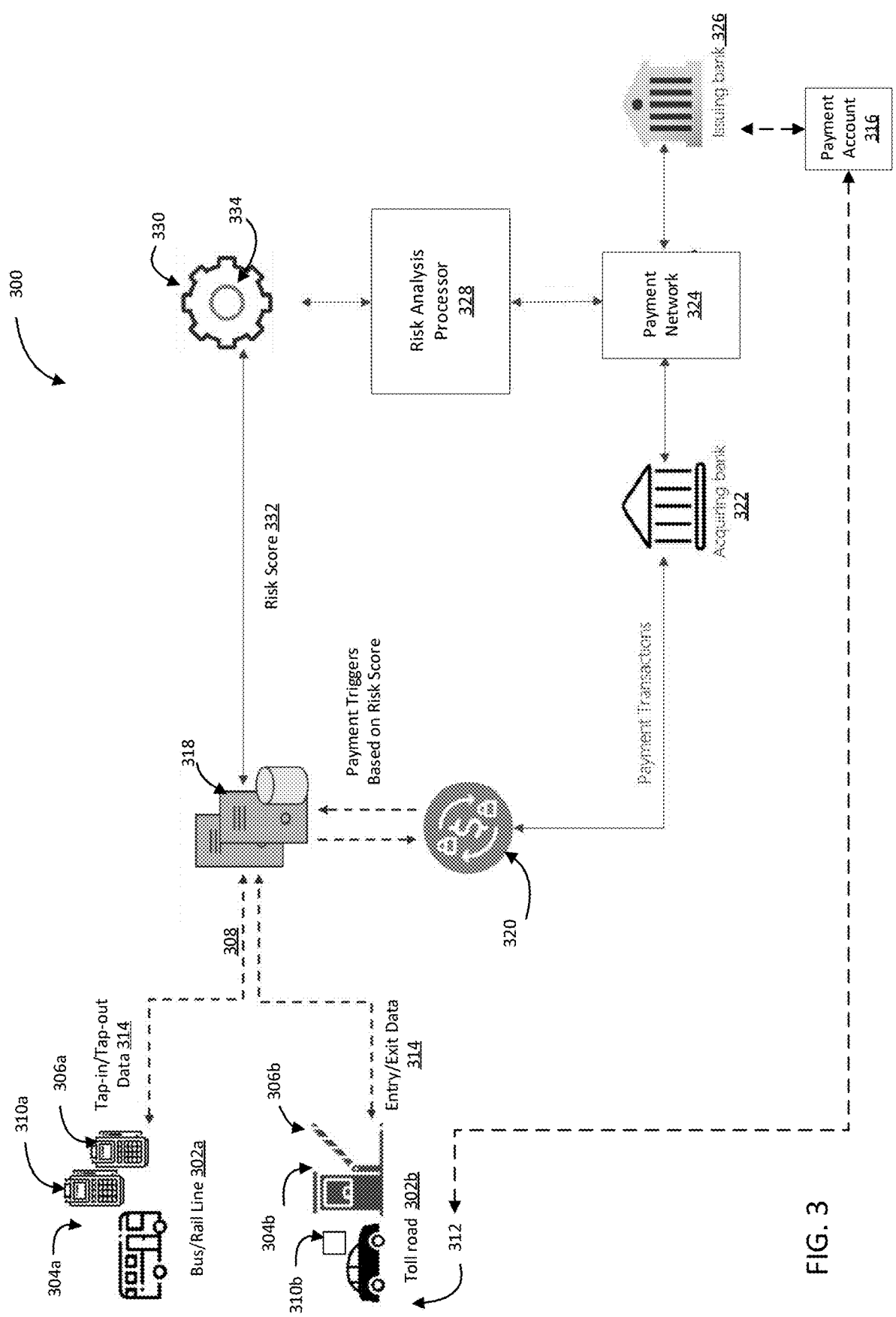
FIG. 3 is a diagram of a system for real-time risk based payment decision service for transit system.

FIG. 3 generally illustrates an embodiment of a system 300 for a obtaining payment using a real-time risk based payment decision service for transit systems. The system 300 may be implemented by a transit operator of a transit system 302*a,b* such as a toll road, a rail line, a bus line, or other transit system. The system 300 may include an entry point 304*a,b*. The entry point 304*a,b* may include a receiver 306*a,b* that receives a signal 308*a,b* from a device 310*a,b* of a user 312. The device may be a card, which may be EMV enabled. The device may also be a portable or mobile device such as a cell phone, laptop, tablet and the like. The device may be a transponder or transmitter that is issued, authorized, or otherwise associated with the transit operator. The receiver 306a,b may be any device capable of receiving an electronic signal from a transmitter such as a RFID receiver or a near field communication (NFC) reader, which may receive signals from the device 310a,b. In addition, the receiver may be a camera that is able to read QR codes and the like, which contain account information 314 and are generated by the device 310a,b.

The receiver 306a,b may receive information 314 for the payment account 316 of the user 312 from the device 310a,b. Once received, the account information 314 may be sent to the transit operator's transit payment system 318. The transit payment system 318 may include or be in communication with a payment processor 320, which initiates the payment authorization process. The payment processor 320 may in turn be in communication with an acquiring bank 322. The acquiring bank may processes the payment transaction once payment authorization has been initialized. To process the payment transaction, the acquiring bank 322 may communication the transaction amount to the issuing bank 326 via a payment network 324 such as VISA.

The issuer bank 326 may issue the payment account 316 to the user 312 and hold the user's funds. If sufficient funds are in the payment account 316 then the issuer bank 326 approves the transaction and the payment is completed. The payment account 316 may be associated with a payment account number, a transaction card, a wallet account, a token, and/or other electronic accounts.

The payment network 324 may also be in communication with a risk analysis processor 328. The risk analysis processor 328 may have access to payment transaction and other data for the user 312 that is obtained and stored by the payment network 324. The risk analysis processor 328 may also include one or more APIs 330 that can be called by the transit payment system 318 either directly or indirectly to determine a risk score 332 for the user 312. The risk analysis processor 328 therefore may also be in direct communication with the transit payment system 318, so that the transit payment system 318 may be able to obtain a risk score 332 or other information directly from the risk analysis processor 328.

The risk score 332 may be determined based on one or more parameters 334. The parameters 334 may include transactions involving the payment account and authorization status of the payment account within a time period. The parameters 334 may also include cross border or abnormal payment transaction involving the payment account within the time period. The time period may be, for example, a week, month, three months, six months, and/or a year.

Figure 4:
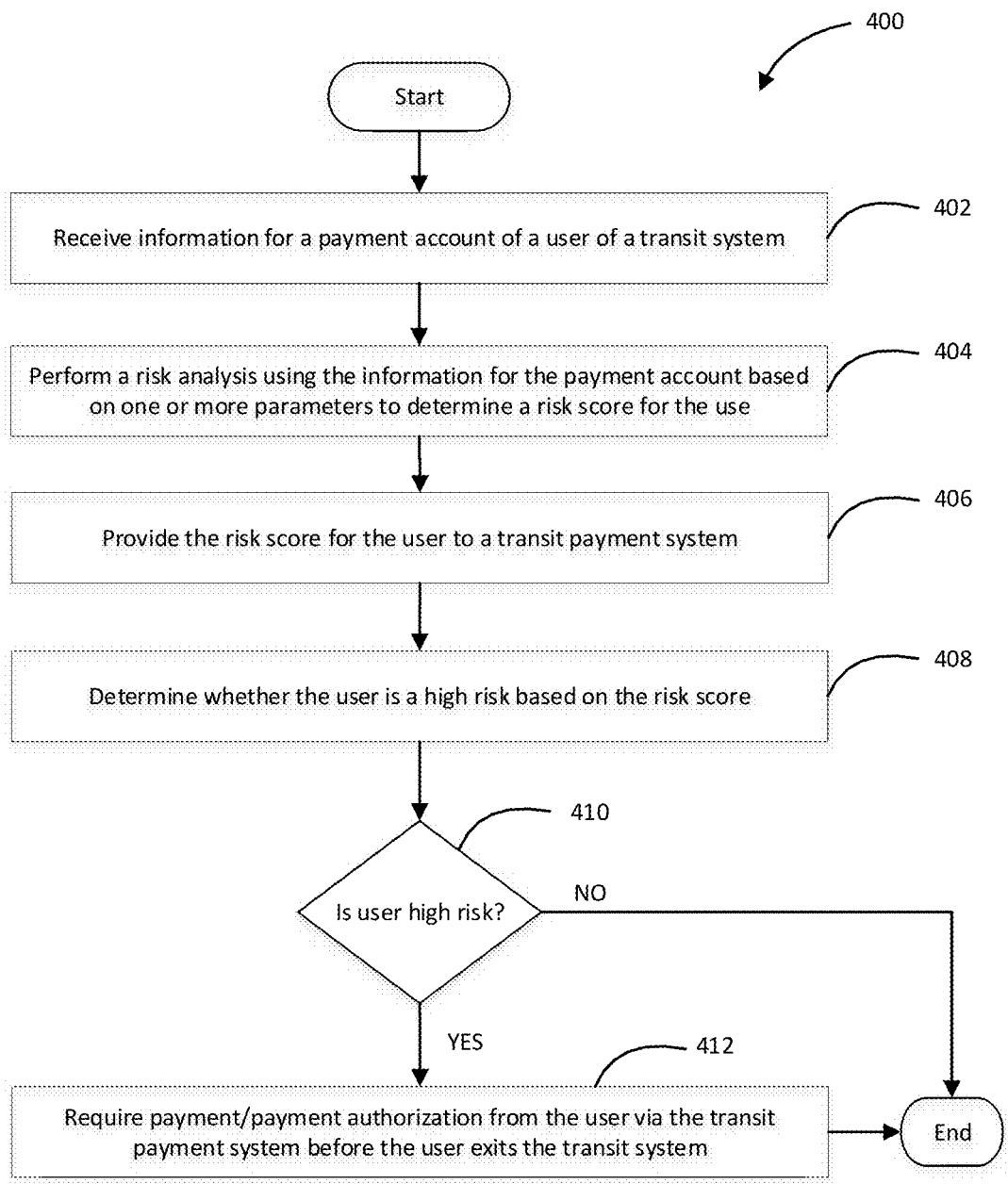
FIG. 4 is a flowchart of a method for real-time risk based payment decision service for transit system.

Turning to FIG. 4, FIG. 4 is a flowchart of an embodiment of a method 400 for obtaining payment using real-time risk based analysis. At a block 402, information 314 for the payment account 316 for the user 312 of the transit system 302 may be received. The information 314 for the payment account 316 may be received at an entry point 304 of the transit system 302 via a receiver 306. As noted above, the receiver 306 may receive the information for the payment account from a device 310 of the user. The receiver 306 may be any device that is able to receive a signal or read data such as a RFID receiver, a NFC reader, a camera and the like.

The device 310 may a card, which may be EMV enabled or a portable or mobile device such as a cell phone, laptop, tablet and the like. The device 310 may be a transponder or transmitter that is issued, authorized, or otherwise associated with the transit operator 301. The payment account may be associated with a wallet account or a token. Further, the information 314 may include a user name, payment account number, an expiration date for the payment account, an address, a zip code, a tokenized payment account number, a card issuer and the like.

At a block 404 a risk analysis may be performed using the information 314 for the payment account 316 based on one or more parameters 334 to determine a risk score 332 for the user 312. The parameters 334 may include transactions involving the payment account and authorization status of the payment account within a time period. The parameters may also include cross border or abnormal payment transaction involving the payment account within the time period. The parameters also may include ecommerce payment and transaction success rate, bill payment or subscription payment success rate, and/or rent or other payment and transaction success rate using the payment account 316 within the time period. The time period may be, for example, a week, month, three months, six months, and/or a year.

The parameters 334 may also include peak payment account usage based on historical data. The historical data may include increased use of the payment account 316 on pay-day or end of the month payments. This type of behavior suggests that the user may be living paycheck to paycheck, which is a higher risk population. One benefit of using a variety of parameters is that a transit operator will get a broader risk view of transit users as the parameters include information outside of transit-only transactions and/or transactions that take place within the transit operator's payment system.

In addition, as mentioned above, deny lists are often kept separately by each transit operator. Transit users who are on a deny list of one transit operator, are not necessarily on the deny list of another transit operator, particularly one that is in a different region or country. Thus, a delinquent transit user of one transit system can go to another transit operator and use his/her delinquent card or account to access and use the other transit system. By using a variety of parameters that may be collected, stored, and/or processed in one place to identify risky transit users (e.g., through payment network 324 or by risk analysis processor 328), such information may be accessible to multiple transit operators and systems and not just a single transit operator.

The risk analysis may be performed via the risk analysis processor 328 and may performed using an API 330. The API may calculate the risk score using the parameters 343. The parameters 343 may be weighed the same or differently depending on which parameters are better predictors for high risk users. The API may be a based on representational state transfer technology (REST) or may be a JSON API.

Once the risk score 332 for the user 312 is determined, the risk score 332 may be provided to the transit payment system 302. The transit payment system 302 may use the risk score 332 to determine whether the user 312 is a high risk. The determination of whether the user 312 is a high risk may be made by comparing the risk score 332 to a predetermined risk threshold. For example, if the risk score 332 is at or above the risk threshold then the user may be determined to be a high risk. Similarly, if the user is at or below the risk threshold, then the user may be determined to be a low risk or vice versa. The determination of whether the user is a high or low risk may be made by the transit payment system 318 or may be made using another API that is called by the transit payment system 318.

If the user 312 is determined to be a low risk, no further action may be taken and payment may be processed through the normal channels once the user exits the transit system 302. If the user is determined to be high risk, then the transit payment system 318 may require payment or payment authorization from the user 312 via the transit payment system before the user exits the transit system 302.

For example, in a tollway setting, the user may be required to exit via a different exit point or gate or tool booth, at which point the full payment for the fare amount may be required. The exit point may include a point of service device that performs the payment transaction. In a different transit setting such as a rail line, the user may be required to pay the full fare amount before an exit gate is opened allowing him to exit.

The ability to address the technical problem of providing a lower risk transit payment system may be just one of many a practical application of these technologies which benefits transit operators and transit users. Transit operators benefit as they are able to provide a more user friendly payment system with a lower risk of losing money, and transit users benefit from not having to prepay or pre-authorize an amount prior to using the transit system.

The devices, such as device 310, may be able to communicate with the receivers, such as receiver 306, described in FIGS. 1-4 via a communication network such as cellular service, through the Internet, a private network, etc., having a variety of communication channels. In some embodiments, the communication channels may be wired such as through an Ethernet cable, a USB cable or RJ6 cable. In other embodiments, the communication channels may be wireless such as through Wi-Fi (802.11 standard), Bluetooth, cellular communication or near field communication (NFC) devices. The communication between the devices and the other components of the systems may be direct or through a wireless network, e.g., Bluetooth, etc.

Figure 5:
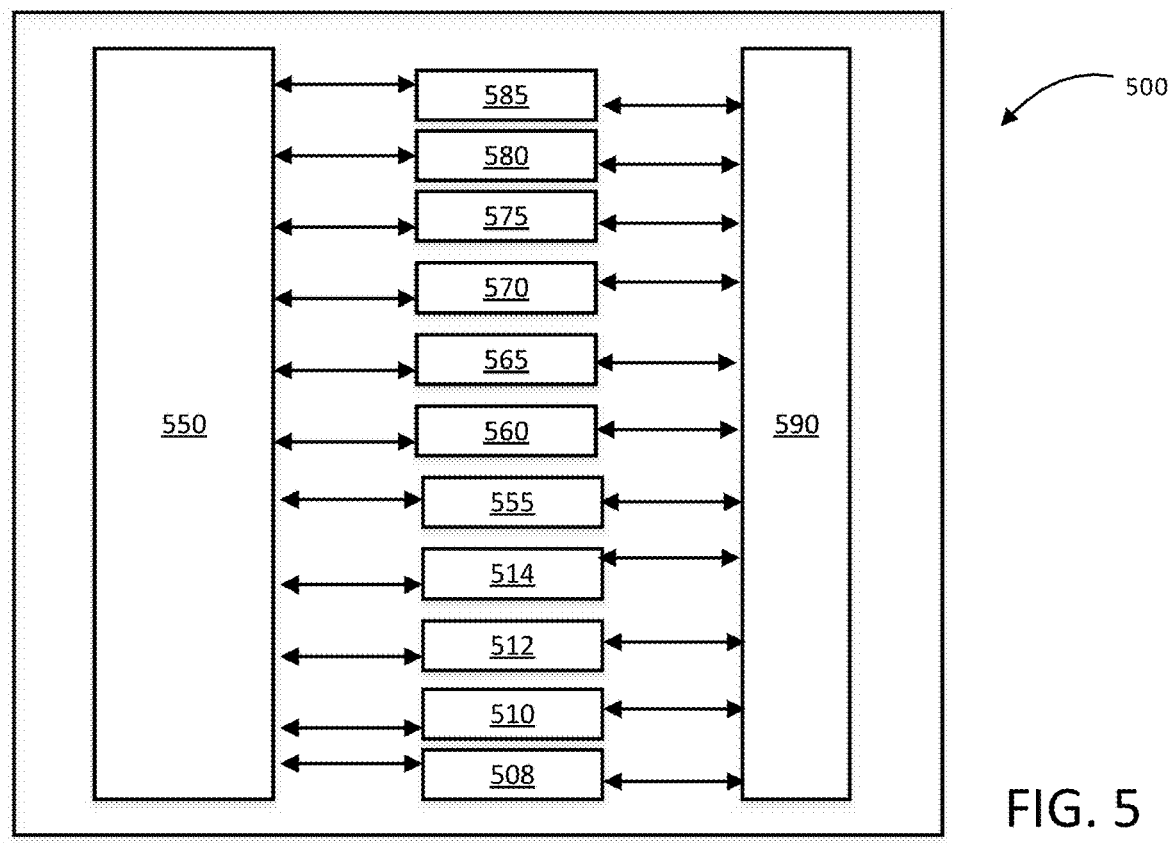
FIG. 5 is a block diagram of system components of a device for use in a transit system.

FIG. 5 may be an example computing device 500, such as device 310, that may be physically configured to interact with another computing device such as receiver 306, and various components of systems and methods 100, 200, 300, and 400. The computing device 500 may have a processor 550 that is physically configured according to computer executable instructions. The computing device 500 may have a portable power supply 555 such as a battery which may be rechargeable. It may also have a sound and video module 560 which assists in displaying video and sound and may turn off when not in use to conserve power and battery life. The computing device 500 may also have volatile memory 565 and non-volatile memory 570 as well as internal storage 575 or external storage 580. The computing device 500 may have GPS capabilities 585 that may be a separate circuit or may be part of the processor 550. There also may be an input/output bus 590 that shuttles data to and from the various user input devices such as a camera 508, a display 510, a transmitter 512, and other inputs 514, etc. It also may control communicating with other computing devices and system components, either through wireless or wired devices. Of course, this is just one embodiment of the computing device 500 and any number and types of computing devices 500 are contemplated.

Figure 6:
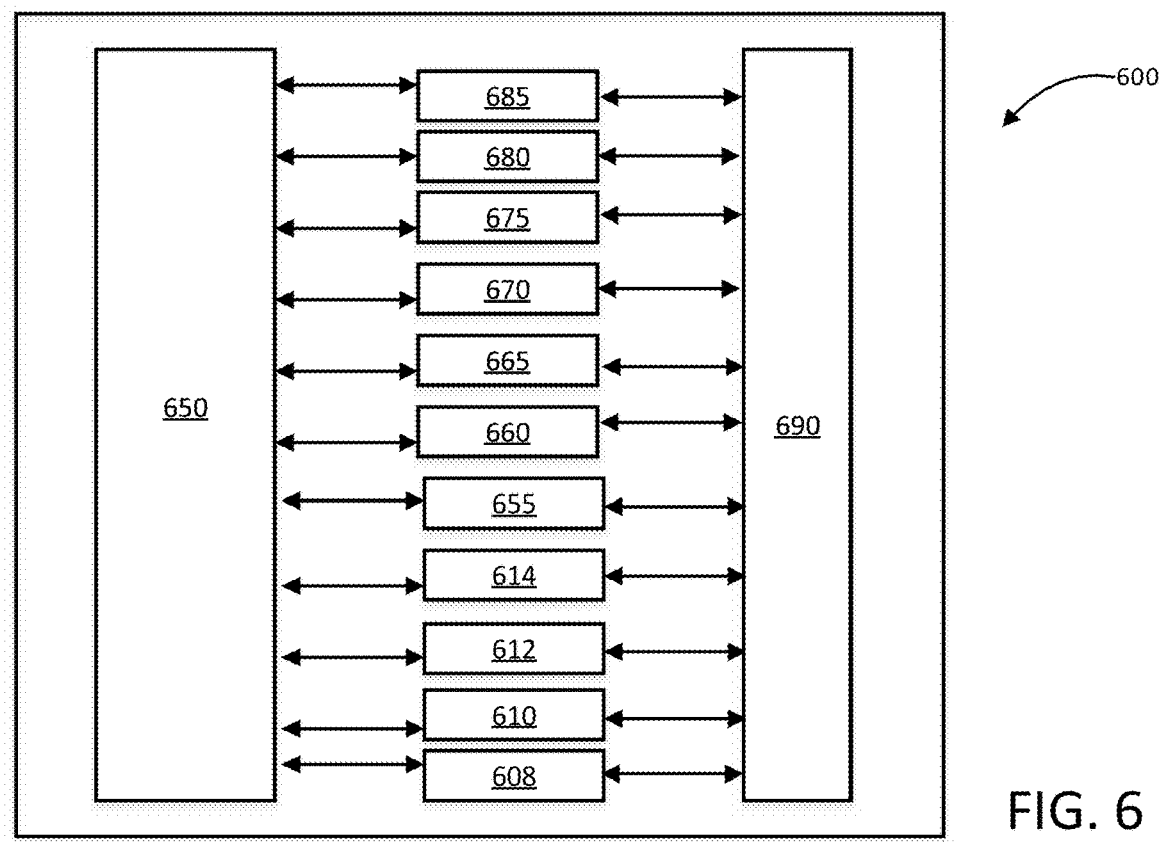
FIG. 6 is a block diagram of system components of a receiver for use in a transit system.

FIG. 6 may be another example computing device 600, such as receiver 306, that may be physically configured to interact with another computing device such as device 310 and transit payment system 318, and various other components of systems 100, 300, and 400. The computing device 600 may have a processor 650 that is physically configured according to computer executable instructions. The computing device 600 may have a portable power supply 655 such as a battery which may be rechargeable. It may also have a sound and video module 660 which assists in displaying video and sound and may turn off when not in use to conserve power and battery life. The computing device 600 may also have volatile memory 665 and non-volatile memory 670, as well as internal storage 675 or external storage 680. The computing device 600 may have GPS capabilities 685 that may be a separate circuit or may be part of the processor 650. There also may be an input/output bus 690 that shuttles data to and from the various user input devices such as a camera 608, a receiver 610, such as receiver 606, and other inputs 614, etc. It also may control communicating with other computing devices and system components, either through wireless or wired devices. Of course, this is just one embodiment of the computing device 600 and the number and types of computing devices 600 is limited only by the imagination.

The transit payment system may also have a processor, such as payment processor 320, a memory, and an input output circuit. The processor may be physically configured according to instructions to enable the communication, generation and interpretation of the information received by the receiver 306 from the device 310 as well as information received from the acquirer 322 and the risk analysis processor 328. The instructions to physically configure the processor to communicate, generate and interpret the information may be custom written, may be from a "white label" source or may be a combination of both.

As a result of the system, numerous technical problems may be addressed and solved. By using the system, the time between a user's use of the transit system and payment will be reduced as high risk users are identified early. Identifying high risk users early decreases the number of computer systems and processor cycles needed to process declined transactions and keep track of delinquent users. In addition, the number of transit users having to be placed on a deny list is reduced. This is beneficial as the number of computer systems and processer cycles needed to create, update, and maintain the deny list is significantly decreased.

In accordance with the provisions of the patent statutes and jurisprudence, exemplary configurations described above are considered to represent a preferred embodiment of the disclosure. However, it should be noted that the claimed method and systems can be practiced otherwise than as specifically illustrated and described without departing from its spirit or scope.

The computing devices, computers, and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The computing devices, computers and/or servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, computers, and/or servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure and claims should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A computer-implemented method for obtaining payment using real-time risk based analysis:
   receiving information for a payment account of a user of a transit system from a reader provided at an entry point of the transit system, wherein the reader receives the information for the payment account from a payment device of the user, wherein the reader is in communication with a transit payment system;
   communicating the information for the payment account to a risk analysis processor via the transit payment system, wherein the risk analysis processor is in communication with a payment network, and wherein the risk analysis processor calculates a risk score for the user by:
      communicating with the payment network to obtain data for one or more parameters;
      determining the risk score for the user by using at least the following parameters: cross border transactions involving the payment account of the user within a time period, a first deny list for the transit system, and a second deny list for a second transit system, wherein the first deny list includes a list of transit users of the transit system who have defaulted on payment, and wherein the second deny list includes a list of second transit users of the second transit system who have defaulted on payment;

communicating the risk score for the user to the transit payment system;

determining whether the user is a high risk by comparing the risk score to a predetermined risk threshold; and in response to a determination that the user is a high risk,
requiring payment authorization from the user before the user exits the transit system;
receiving payment authorization from the user from a point of sale device at an exit point of the transit system;
communicating the payment authorization to a payment processor in communication with the transit payment system to initiate a payment transaction using the payment account of the user; and
causing a gate at the exit point to be opened upon completion of the payment transaction.

2. The method of claim 1, wherein the transit system is a toll road, a rail line, or a bus line.

3. The method of claim 1, wherein the reader is a radio-frequency identification (RFID) reader.

4. The method of claim 1, wherein the payment device is a transaction card.

5. The method of claim 1, wherein the information for the payment account for the user includes one or more of a user name, a payment account number, an expiration date, an address, a zip code, a tokenized payment account number, and a card issuer.

6. The method of claim 1, wherein the one or more parameters include transactions involving the payment account and authorization status of the payment account the time period, abnormal payment transactions involving the payment account within the time period, or peak payment account usage based on historical data.

7. The method of claim 6, wherein the historical data includes increased use of the payment account on pay-day or end of the month payments.

8. The method of claim 6, wherein the time period is six months.

9. The method of claim 1, further comprising:
using an application programming interface (API) to calculate the risk score for the user.

10. The method of claim 1, wherein the payment processor communicates with an acquiring bank to process the payment transaction.

11. The method of claim 1, wherein each of the one or more parameters is given the same weight.

12. The method of claim 1, wherein each of the one or more parameters is given a different weight.

13. A processor-readable non-transitory medium storing processor-issuable instructions configured to cause a processor to:
receive information for a payment account of a user of a transit system from a reader provided at an entry point of the transit system, wherein the reader receives the information for the payment account from a payment device of the user, wherein the reader is in communication with a transit payment system;
communicate the information for the payment account to a risk analysis processor via the transit payment system, wherein the risk analysis processor is in communication with a payment network and the risk analysis processor is configured to:
communicate with the payment network to obtain data for one or more parameters;
determine a risk score for the user by using at least the following parameters: cross border transactions involving the payment account of the user within a time period, a first deny list for the transit system, and a second deny list for a second transit system, wherein the first deny list includes a list of transit users of the transit system who have defaulted on payment, and wherein the second deny list includes a list of second transit users of the second transit system who have defaulted on payment;
communicate the risk score for the user to the transit payment system;
determine whether the user is a high risk by comparing the risk score to a predetermined risk threshold; and
in response to a determination that the user is a high risk,
require payment authorization from the user before the user exits the transit system;
receive payment authorization from the user from a point of sale device at an exit point of the transit system;
communicate the payment authorization to a payment processor in communication with the transit payment system to initiate a payment transaction using the payment account of the user; and
cause a gate at the exit point to be opened upon completion of the payment transaction.

14. The processor-readable non-transitory medium of claim 13, wherein the transit system is a toll road, a rail line, or a bus line.

15. The processor-readable non-transitory medium of claim 13, wherein the one or more parameters include transactions involving the payment account and authorization status of the payment account within the time period, abnormal payment transactions involving the payment account within the time period, or peak payment account usage based on historical data.

16. A system for obtaining payment using real-time risk based analysis, comprising:
a transit payment system, wherein the transit payment system has a processor that is configured to:
receive information for a payment account of a user of a transit system from a reader provided at an entry point of the transit system, wherein the reader receives the information for the payment account of the user from a payment device of the user, wherein the transit payment system is in communication with a risk analysis processor;
communicate the information for the payment account to the risk analysis processor to calculate a risk score for the user, the risk analysis processor being configured to:
communicate with a payment network to obtain data for one or more parameters;
determine a risk score for the user by using at least the following parameters: cross border transactions involving the payment account of the user within a time period, a first deny list for the transit system, and a second deny list for a second transit system, wherein the first deny list includes a list of transit users of the transit system who have defaulted on payment, and wherein the second deny list includes a list of second transit users of the second transit system who have defaulted on payment;

communicate the risk score for the user to the transit payment system;

determine whether the user is a high risk by comparing the risk score to a predetermined risk threshold;

in response to a determination that the user is a high risk,
require payment authorization from the user before the user exits the transit system;

receive payment authorization from the user from a point of sale device at an exit point of the transit system;

communicate the payment authorization to a payment processor in communication with the transit payment system to initiate a payment transaction using the payment account of the user; and cause a gate at the exit point to be opened upon completion of the payment transaction.

17. The system of claim 16, wherein the transit system is a toll road, a rail line, or a bus line.

18. The system of claim 16, wherein the one or more parameters include transactions involving the payment account and authorization status of the payment account within the time period, abnormal payment transactions involving the payment account within the time period, or peak payment account usage based on historical data.

19. The system of claim 18, wherein the time period is six months.

20. The system of claim 16, wherein the payment device is a transaction card.

* * * * *